United States Patent [19]

Oddenino

[11] Patent Number: 4,717,301
[45] Date of Patent: Jan. 5, 1988

[54] PANEL FASTENER SUPPORTING BUSH FOR COVER PANELS COMPRISING A BASE PANEL AND A FOAM PORTION

[75] Inventor: Manrico Oddenino, Buttigliera Alta, Italy

[73] Assignee: ITW Fastex Italia S.p.A., Turin, Italy

[21] Appl. No.: 14,295

[22] Filed: Feb. 13, 1987

[30] Foreign Application Priority Data

Feb. 21, 1986 [IT] Italy ............... 53016/86[U]

[51] Int. Cl.⁴ ............................................. F16B 19/00
[52] U.S. Cl. ................................... 411/373; 411/360; 411/82; 411/431; 411/372; 52/511
[58] Field of Search ................. 411/82, 360, 372, 373, 411/377, 431, 908, 999; 52/511, 512, 704, 710

[56] References Cited

U.S. PATENT DOCUMENTS

| 2,899,700 | 8/1959 | Egan | 411/372 X |
|---|---|---|---|
| 3,000,066 | 9/1961 | Cochran | 411/908 X |
| 3,037,596 | 6/1962 | Fordyce | 52/511 |
| 3,411,816 | 11/1968 | Andrews et al. | 411/431 X |
| 3,771,275 | 11/1973 | Seckerson | 52/511 X |
| 4,122,583 | 10/1978 | Grittner et al. | 52/511 X |
| 4,136,598 | 1/1979 | Hughes | 411/372 |
| 4,214,505 | 7/1980 | Aimar | 411/373 |
| 4,312,165 | 1/1982 | Mizusawa | 411/57 X |
| 4,472,918 | 9/1984 | Mach | 52/511 |
| 4,631,887 | 12/1986 | Francovitch | 411/373 X |

FOREIGN PATENT DOCUMENTS

| 1171209 | 5/1964 | Fed. Rep. of Germany | 411/360 |
|---|---|---|---|
| 1211068 | 10/1959 | France | 411/373 |
| 890049 | 2/1962 | United Kingdom | 411/373 |
| 1116444 | 6/1968 | United Kingdom | 411/373 |

Primary Examiner—Robert L. Wolfe
Assistant Examiner—Suzanne L. Dino
Attorney, Agent, or Firm—J. P. O'Brien; T. W. Buckman

[57] ABSTRACT

A supporting bush designed to define a connecting seat for a known type of panel fastener on a motor vehicle interior cover panel composed of a base panel and a foam portion; the aforementioned bush being composed of a first cup-shaped element, designed to be gripped in fluidtight manner between the foam portion and the base panel; a second cup-shaped element, designed to click on to the first so as to define with the same an inner cavity for receiving the head on the panel fastener; and a break-off tab for protecting a sleeve portion on the second cup-shaped element, through which sleeve portion access is permitted to the aforementioned inner cavity.

6 Claims, 7 Drawing Figures

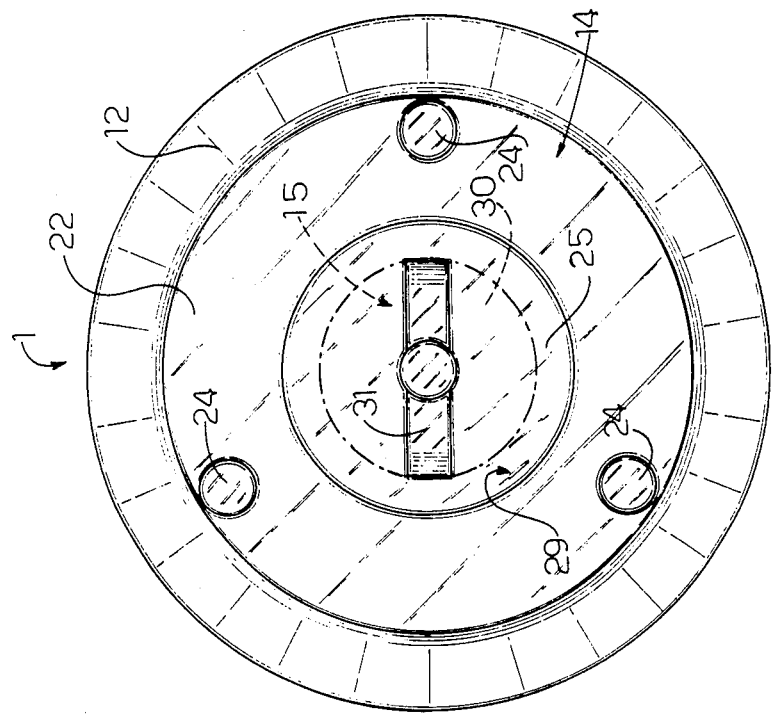
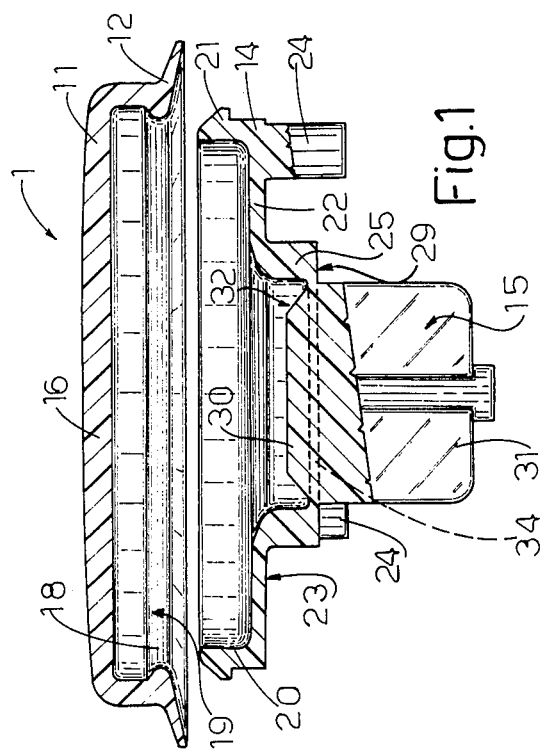
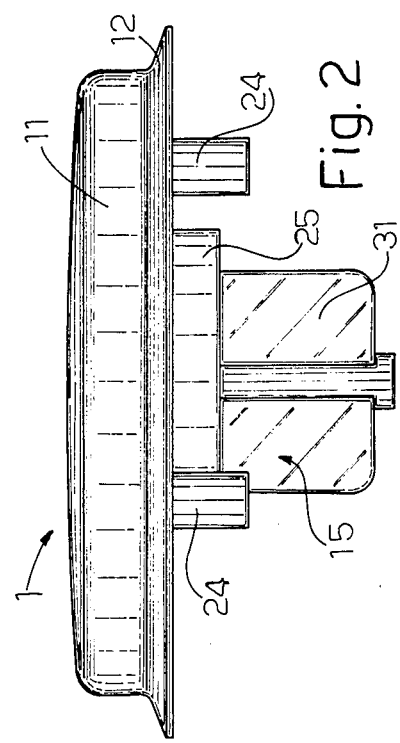

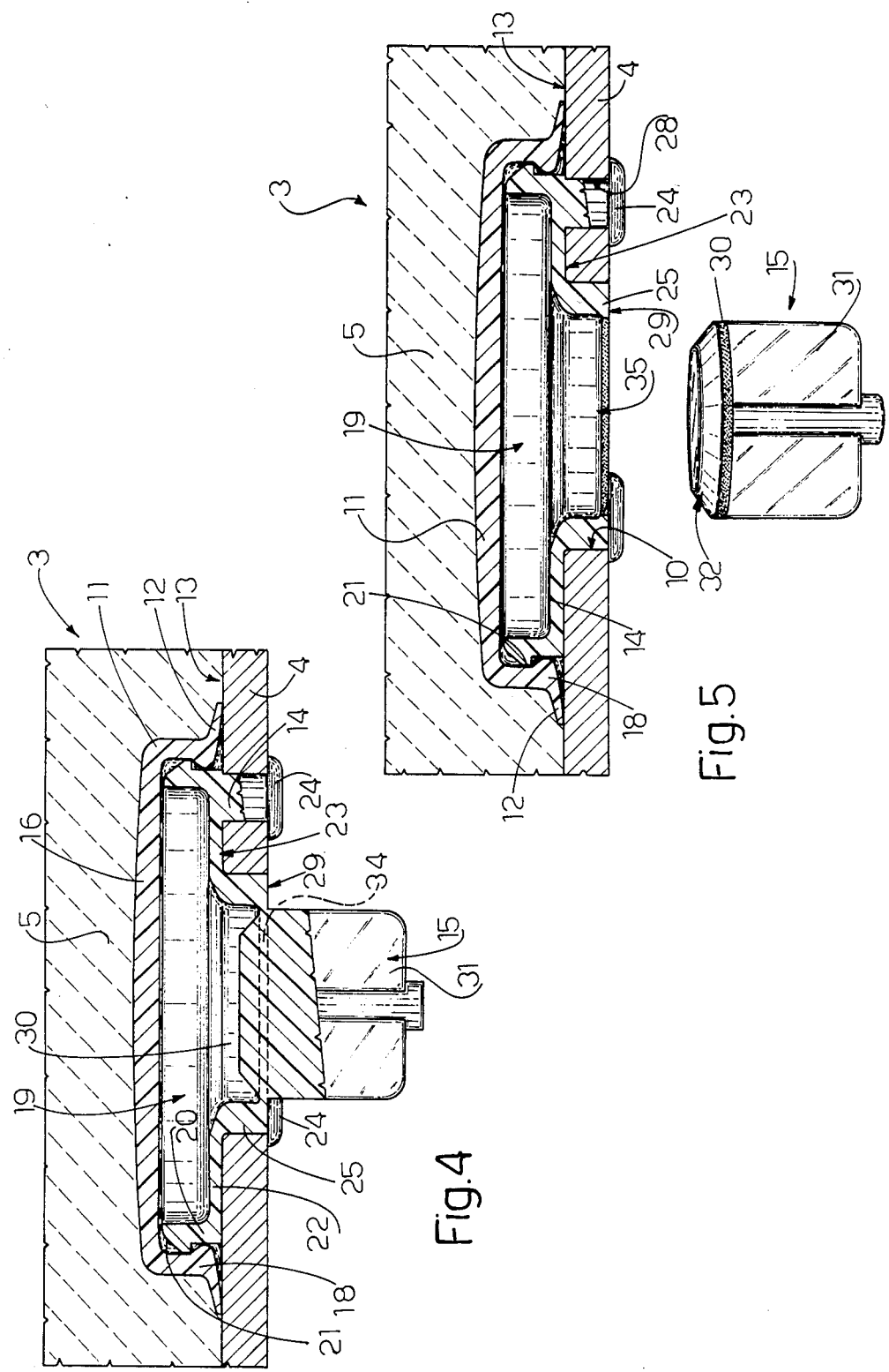

PANEL FASTENER SUPPORTING BUSH FOR COVER PANELS COMPRISING A BASE PANEL AND A FOAM PORTION

BACKGROUND OF THE INVENTION

The present invention relates to a supporting bush for a panel fastener designed to enable click-on assembly on to a support, e.g. an inner vehicle body member, of a cover panel comprising a base panel and a foam portion, of the type normally employed for panelling the interior of vehicle passenger compartments.

As described in Italian Utility Model Patent Application n. 53286-B/83 filed on 5/5/1983 by the present Applicant and entitled "Composite cover panel, particularly for internal panelling of motor vehicle body panels", the content of which is included herein as required by way of reference, for forming the seats for the connecting heads on the panel fasteners normally employed in the car industry, the panels are known to be fitted, during manufacture, with protective cups inserted into respective through holes on the base panel, usually made of compressed board, and later sunk into the finished panel when this is foam-padded using plastic foam resin, e.g. polyurethane. During the padding stage, however, part of the foam resin may seep inside the cup, despite the sealing lip on the same, and through the respective hole in the base panel, thus filling the space reserved for the panel fastener head. This not only makes assembly work difficult, but also requires a certain amount of adjustment which is both costly and reduces output efficiency.

SUMMARY OF THE INVENTION

The aim of the present invention is to overcome the aforementioned drawback by providing a panel fastener supporting bush designed to define a fastener head seat inside the cover panel, and, at the same time, prevent foam resin from seeping inside the said seat so formed.

With this aim in view, according to the present invention, there is provided a supporting bush for a panel fastener designed to enable click-on assembly on to a support, e.g. an inner vehicle body member, of a cover panel comprising a base panel and a foam portion; the said bush being formed in such a manner as to be locked, during manufacture of the said cover panel, between the said base panel and the said foam portion; characterised by the fact that it comprises:

a first cup-shaped element having a peripheral annular sealing lip designed to cooperate, in substantially fluidtight manner, with an inner surface of the said base panel and designed to be gripped under pressure between the said base panel and the said foam portion;

a second cup-shaped element secured integral with the said first element, with its concave side facing that of the said first element, so as to define with the same an inner cavity for housing the head of the said panel fastener; the said second cup-shaped element comprising a sleeve portion and respective pins for assembly to the said base panel; said pins projecting axially from the opposite side to that facing the said first cup-shaped element and being designed to engage with respective through holes on the said base panel;

a break-off tab projecting from the mouth of the said sleeve portion in such a manner as to close off the said inner cavity and determine, at the said sleeve portion and subsequent to breakage, the formation of a through hole enabling access to the said cavity and engageable by the said panel fastener.

BRIEF DESCRIPTION OF THE DRAWINGS

One embodiment of the present invention will be described by way of a non-limiting example with reference to the accompanying drawings, in which:

FIG. 1 shows a partially-sectioned, broken-down view of a panel fastener supporting bush according to the present invention;

FIGS. 2 and 3 show an elevation and underside view respectively of the FIG. 1 bush;

FIGS. 4, 5 and 6 show the manner in which the bush according to the present invention is used;

DETAILED DESCRIPTION OF THE INVENTION

Figure 7:
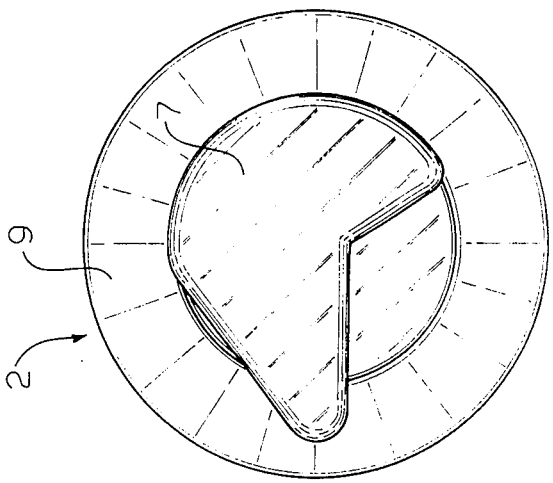
FIG. 7 shows a topside view of the panel fastener accommodated by the bush according to the present invention.

Number 1 in FIGS. 1, 2, 3, 6 and 7 indicates a supporting bush for a known type of panel fastener 2 designed to enable click-on assembly on to a support (not shown), e.g. an inner vehicle body member, of a known type of cover panel 3 (shown only partially) comprising a base panel 4, preferably made of compressed board, and a foam portion 5 constituting the padding of panel 3 and preferably formed from plastic resin foam, e.g. polyurethane, secured in known manner to base panel 4. Panel fastener 2 comprises a finned shank 6 and an assembly head 7 defined towards shank 6 by an elastically deformable supporting collar 9, and shaped in known manner (FIG. 7) so as to fit obliquely inside a hole 10 on panel 4 and lock inside the same by means of a half turn. The function of bush 1 is to define, inside panel 3 as a whole and, in particular, inside foam portion 5, a seat for housing the said head 7.

According to the present invention, bush 1 comprises a first cup-shaped element 11 having a radially outer, peripheral, annular sealing lip 12 designed to cooperate in substantially fluidtight manner with an inner surface 13 of base panel 4 and to be gripped under pressure and as a whole between the said base panel 4 and foam portion 5; a second cup-shaped element 14 designed to mate integral with element 11; and a break-off tab 15 projecting from element 14 on the opposite side to element 11. In more detail, element 11 is cup-shaped with a slightly rounded end wall 16, is made of relatively deformable synthetic plastic, and presents internally, next to sealing lip 12, which is also elastically deformable, a radially inner, annular rib 18 having a curved profile. Element 14 presents its concave side facing that of element 11, so as to define with the same, when mated, an inner cavity 19 for housing head 7. Element 14 is made of relatively firmer synthetic plastic than that of element 11, and comprises a cylindrical side wall 20 having externally, on its end edge, a radially outer, serrated, annular rib 21 designed to click on to and over rib 18 (FIG. 6) so as to permanently click together elements 11 and 14; and a flat end wall 22 facing end wall 16 and provided in axially projecting manner on outer face 23, on the opposite side to element 11, with a number of known peripheral assembly pins 24, and with a central cylindrical sleeve portion 25. Both portion 25 and pins 24 are designed to engage with respective through holes in panel 4, to be more precise, hole 10 and respective holes 28 formed surrounding each hole 10. Pins 24 are longer than portion 25, so as to enable them to be riveted in known manner to panel 4, and so secure element 14 and, with it, bush 1 (FIG. 6) permanently to panel 4.

Figure 6:
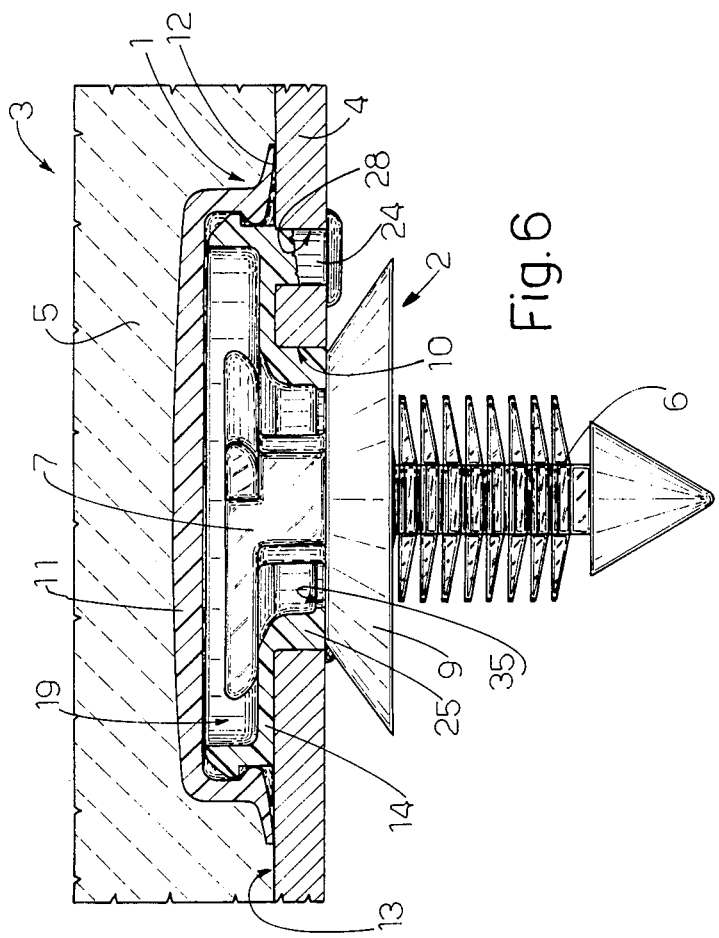

Tab 15 projects from the mouth of sleeve portion 25, flush with front end edge 29 of the same, and closing off cavity 19. Tab 15 comprises a plug-shaped base portion 30, and a tab-shaped grip portion 31 designed to be gripped manually or by means of an appropriate implement and projecting axially from base portion 30. Tab 15 is formed integral in one piece with portion 25, just as portion 25 is formed integral with end wall 22; is provided towards element 11 with a beveled, truncated-cone-shaped edge 32 extending inside sleeve portion 25; and is connected to the said sleeve portion 25, for example, by means of a thin, break-away wall 34, relatively much thinner than base portion 30, or, according to a possible variation (not shown), by means of a number of break-off radial connecting bridges (e.g. 2 or 3). Tab 15 is at any rate connected to portion 25 in such a manner as to be easily detached from the same subsequent to pressure being applied on portion 31, and in such a manner as to determine, on edge 29, subsequent to breakage, the formation of a through hole 35 (FIG. 5) engageable by panel fastener 2 (FIG. 6). With reference also to FIGS. 4 and 5, bush 1 is produced by separately molding element 11 and element 14 complete with integral tab 15 designed to break off easily by virtue of it being connected weakly to edge 29. The two elements 11 and 14 are then clicked together so as to form bush 1, which is then secured integral with panel 4 by means of pins 24, with face 23 resting against surface 14 and sleeve portion 25 inside hole 10. Finally, foam portion 5 is prepared in known manner by injecting the same over panel 4. During injection and expansion of the resin of which portion 5 is composed, element 11 is pressed against panel 4 so as to press lip 12 against surface 13 and so seal off the expanding resin and prevent it from seeping inside cavity 19. What little resin manages to seep underneath panel 4 is also prevented from entering cavity 19 by virtue of access to the same, via sleeve portion 25, being cut off by tab 15, in particular, by plug portion 30 of the same. Upon completion of the injection and expansion phase, during which absolutely no foam resin has been allowed to seep into cavities 19, the resulting panel 3 presents bushes 1, previously secured to panel 4, sunk into panel 3 and gripped between panel 4 and foam portion 5. At this point, tabs 15 are gripped either manually or mechanically and, by exerting pressure on portions 31, are detached from edge 29 of each sleeve portion 25 so as to form holes 35 which, together with perfectly clean cavities 19, define the seats in which to house, in known manner, heads 7 of panel fasteners 2. The advantages of the supporting bush according to the present invention will be clear from the foregoing description. In addition to being cheap and easy to produce, it results in substantially no increase in panel assembly cost, by virtue of tab 15 being easily detachable. On the contrary, it provides for troublefree assembly of the panel fastener by preventing foam material from seeping inside the fastener seat. Furthermore, instead of resting against relatively weak base panel 4, the head of the fastener now rests against relatively strong, rigid element 14, thus improving assembly of the panel.

What is claimed is:

1. A supporting bush for a panel fastener designed to enable click-on assembly on to a support, e.g. an inner vehicle body member, of a cover panel comprising a base panel and a foam portion; the said bush being formed in such a manner as to be locked, during manufacture of the said cover panel, between the said base panel and the said foam portion; characterised by the fact that it comprises:

a first cup-shaped element having a peripheral annular sealing lip designed to cooperate, in substantially fluidtight manner, with an inner surface of the said base panel and designed to be gripped under pressure between the said base panel and the said foam portion;

a second cup-shaped element secured integral with the said first element, with its concave side facing that of the said first element, so as to define with the same an inner cavity for housing the head of the said panel fastener; the said second cup-shaped element comprising a sleeve portion and respective pins for assembly to the said base panel; said pins projecting axially from the opposite side to that facing the said first cup-shaped element and being designed to engage with respective through holes on the said base panel;

a break-off tab projecting from the mouth of the said sleeve portion in such a manner as to close off the said inner cavity and determine, at the said sleeve portion and subsequent to breakage, the formation of a through hole enabling access to the said cavity and engageable by the said panel fastener.

2. A supporting bush as claimed in claim 1, characterised by the fact that the said first and the said second cup-shaped elements are clicked together by the engagement of a respective inner and outer peripheral annular rib.

3. A supporting bush as claimed in claim 1, characterised by the fact that the said connecting pins and the said sleeve portion on the said second cup-shaped element are formed in projecting manner on the outer face of a flat end wall on the said second cup-shaped element; the said pins being formed peripherally and the said sleeve portion being formed centrally; and the said pins being longer than the said sleeve portion for enabling them to be riveted to the said base panel.

4. A supporting bush as claimed in claim 1, characterised by the fact that the said break-off tab comprises a plug-shaped base portion and a tab-shaped grip portion projecting axially from the said base portion; the said base portion being formed integral in one piece with the said sleeve portion of the said second cupshaped element, flush with a front end edge of the same.

5. A supporting bush as claimed in claim 4, characterised by the fact that the said base portion of the said break-off tab presents a beveled truncated-cone-shaped edge extending inside the said sleeve portion of the said second cup-shaped element, and is connected to the said front edge of the said sleeve portion by at least one break-away element relatively much thinner than the said base portion.

6. A cover panel, in particular for motor vehicles, comprising a base panel, formed from compressed board, and a foam portion, formed from synthetic plastic resin foam and secured to the said base panel; provision being made between the said base panel and the said foam portion for a number of seats for respective known panel fasteners, which seats are accessible through respective holes formed through the said base panel; characterised by the fact that the said seats are defined by respective supporting bushes as claimed in claim 1; which bushes are incorporated during manufacture between the said base panel, to which they are secured, and the said foam portion, and are subsequently detached from the said breakoff tab.

* * * * *